(Model.)

P. KEENE.
Chain Conveyer.

No. 236,438.    Patented Jan. 11, 1881.

Attest:
J. M. Gould
C. R. Ainsworth

Inventor:
Phillip Keene ated January 11, 1881.

UNITED STATES PATENT OFFICE.

PHILLIP KEENE, OF MOLINE, ILLINOIS.

CHAIN-CONVEYER.

SPECIFICATION forming part of Letters Patent No. 236,438, dated January 11, 1881.

Application filed July 23, 1880. (Model.)

*To all whom it may concern:*

Be it known that I, PHILLIP KEENE, of Moline, in the county of Rock Island and State of Illinois, have invented certain new and useful Improvements in Chain Conveyers or Carriers; and I do hereby declare that the following is a full, clear, and exact description of the invention, which will enable others skilled in the art to which it appertains to make and use the same, reference being had to the accompanying drawings, which form a part of this specification, and to the letters and figures of reference marked thereon.

Figure 1:
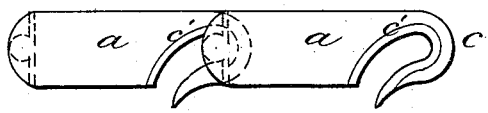
Figure 2:
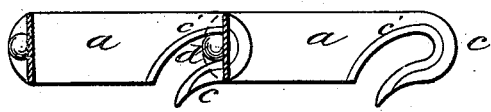
Figure 3:
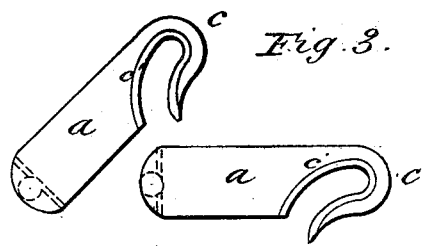
Figure 4:
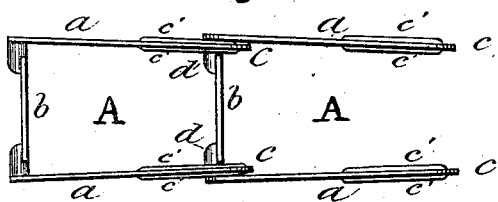

Figure 1 represents a side view of my chain-conveyer. Fig. 2 is a sectional view of the links composing the same. Fig. 3 is a detailed view, showing the manner of attaching and detaching the links. Fig. 4 is a top view of the chain.

This invention relates to what are called "chain conveyers or carriers," which are used in saw-mills and wood-working establishments for conveying off sawdust and refuse of the mill; and my invention consists in a chain-conveyer which is made up of detachable links for the purpose of more easily and readily substituting new links for broken ones, and for lengthening or shortening the chain, and obviates the necessity of cutting out or using rivets, the links not being liable to casual detachment, as hereinafter more fully set forth and described.

The links A A are made of a rectangular form, longer than they are broad, their side bars, *a a*, and the end bar, *b*, being flat and of width proportioned to the size of the chain to be used. On one end of the side bars, *a a*, are formed hooks *c c*, made and formed to receive the journals *d d* of end bar, *b*, and curved in such manner as to prevent disconnection when in use. The end bar, *b*, is made the same width of the side bars, *a a*, and is the main conveyer or carrier. Being of sufficient width, it serves of itself to convey, and makes useless the attaching of wooden floats, as is often found necessary. The bar *b* is of one piece with the side bars, *a a*, but slotted at each end, and the journals *d d* formed to fit in the hooks *c c*, making, in connection with the side bars, *a a*, one solid double hook, as shown, Fig. 2, which, being attached by hooking to the journals, forms one continuous chain.

The manner of connecting the links to make a chain, and also disconnecting them, is to bring the link to an angle of about forty-five degrees, as shown in Fig. 3, when it will easily slip from the next connecting-link. The same reverse movement connects the links. When the links are coupled the hooks of one link are received between the side bars of another link, and when straightened, will not uncouple. The hooks *c c* on side bars, *a a*, are brought together sufficient to pass inside of the next link and connect to journals *d d*.

Among the many advantages attending my invention are, the links may be made all of one piece cast of malleable iron; can be taken apart or put together without bending, riveting, or altering; is easily connected, lengthened, or repaired by inserting new links when needed: the connections make equal bearings on each other, thereby preventing lateral motion of the chain when run slack; and the chain, when constructed as described, will carry off a greater amount of matter with a full third less speed than is usually allowed in such work.

What I claim as new, and desire to secure by Letters Patent, is—

The combination, in a chain-conveyer, of the solid float or carrier with the journals *d d'* of the end bar, *b*, substantially as and for the purpose specified and set forth.

In testimony that I claim the foregoing as my own I have hereto affixed my signature in presence of two witnesses.

PHILLIP KEENE.

Witnesses:
   JNO. GOULD,
   C. R. AINSWORTH.